United States Patent Office.

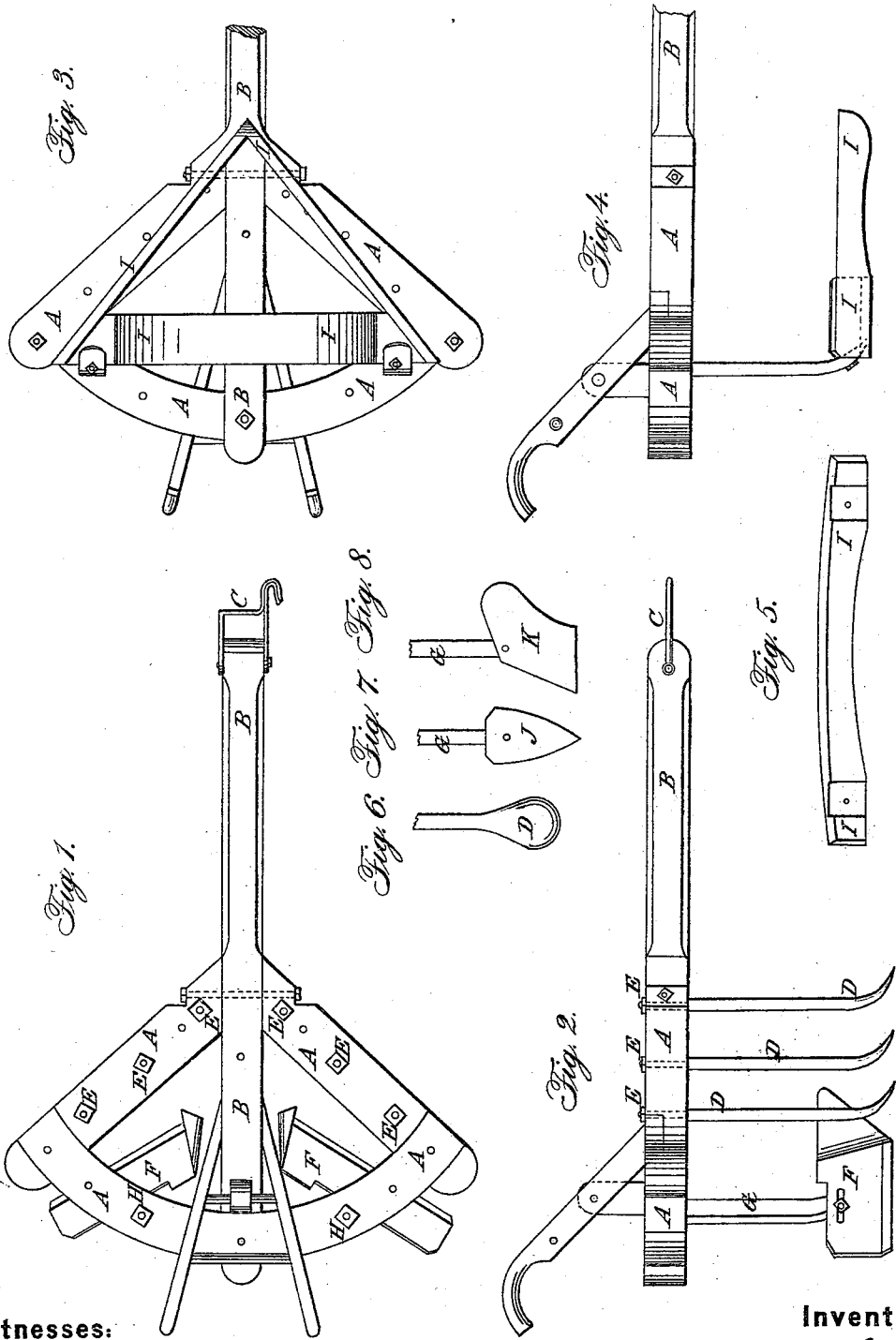

J. E. TATE, OF COLUMBIA, TENNESSEE.

*Letters Patent No. 64,165, dated April 23, 1867.*

---

IMPROVEMENT IN CULTIVATORS.

---

*The Schedule referred to in these Letters Patent and making part of the same.*

---

TO ALL WHOM IT MAY CONCERN:

Be it known that I, J. E. TATE, of Columbia, in the county of Maury, and State of Tennessee, have invented a new and useful Improvement in Cultivator; and I do hereby declare that the following is a full, clear, and exact description thereof, which will enable others skilled in the art to make and use the same, reference being had to the accompanying drawings, forming part of this specification, in which—

Figure 1 is a top view of my improved cultivator with the harrow teeth and scrapers attached.

Figure 2 is a side view of the same.

Figure 3 is an under side view of the same, the harrow teeth and scrapers being removed, and the cotton coverer attached.

Figure 4 is a side view of the same.

Figure 5 is a rear view of the cotton coverer detached from the cultivator frame.

Figure 6 is a detail view of the lower part of one of the harrow teeth.

Figures 7 and 8 are detail views of different forms of ploughs to be used upon the cultivator.

Similar letters of reference indicate like parts.

My invention has for its object to furnish an improved cultivator designed especially for use in cultivating cotton, but equally applicable to other uses; and it consists, first, in so constructing the cultivator that both sides of the row may be cultivated at the same time; second, in the adjustable scrapers in combination with the bars and frame of the cultivator; third, in the cotton coverer in combination with bars and frame of the cultivator; fourth, in the detachable ploughs in combination with the bars and frame of the cultivator.

A is the frame of the cultivator, to which the beam B is securely attached. C is the clevis placed upon the forward end of the beam B, to which the horse is attached, and which is so formed, as shown in fig. 1, that the horse can walk on one side of the row while drawing the cultivator. D are the harrow teeth, the shanks of which pass through holes in the frame A, and are secured in place by the nuts E, as shown in the drawings. The front harrow teeth have several holes formed in the frame A for their reception, so that they may be set at a less or greater distance apart as the case may require. F are the scrapers which are adjustably attached to the lower ends of the bars G by bolts passing through slots in said scrapers and through the said bars, as shown in fig. 2. The upper ends of the bars G pass up through the frame A and are secured in place by the nuts H. This construction enables the scrapers F to be adjusted at any required distance apart. The scrapers F, in connection with the harrow teeth D, are used for harrowing and scraping cotton. I is the cotton coverer, which is made of wood and in substantially the form shown in the drawings. The under side of the main or covering-bar is made curved, as shown in fig. 5, so as to conform to the shape of the ridge or row. The inclined bars, that meet in a point in front of the main bar, are designed to remove clods or other impediments from the row and leave it in better condition for the covering-bar. The coverer is designed to be used in connection with the harrow teeth D, but if the ground is finely pulverized it may be used without said teeth. In using the coverer I the scrapers F are removed, the bars G inserted in the outer holes through the rear circular bar of the frame A, and the coverer I attached to their lower ends by bolts and nuts, as shown in figs. 3 and 4. J and K are ploughs to be attached to the lower ends of the bars G, and secured in place by bolts and nuts. The ploughs J are to be used for the first, and the ploughs K for the subsequent ploughing. The ploughs K may be made to turn the soil in either direction by moving each of them from one side of the frame A to the other. In using either set of the ploughs J K the harrow teeth D should be removed, and the bars G placed in the outer holes in the curved rear bar of the frame A. In using the harrow alone, without the scrapers F or other parts, a central tooth may be placed in the hole through the beam B, shown in figs. 1 and 3.

What I claim as new, and desire to secure by Letters Patent, is—

1. The adjustable scrapers F, constructed as herein shown and described, in combination with the bars G and frame A of the cultivator, substantially as and for the purpose set forth.

2. The cotton coverer I, constructed as herein shown and described, in combination with the bars G and frame A of the cultivator, substantially as and for the purpose set forth.

J. E. TATE.

Witnesses:
G. W. CAMPBELL,
E. N. HANKS.